US009850329B2

(12) United States Patent
Yoo et al.

(10) Patent No.: US 9,850,329 B2
(45) Date of Patent: Dec. 26, 2017

(54) FARNESENE-BASED POLYMERS AND LIQUID OPTICALLY CLEAR ADHESIVE COMPOSITIONS INCORPORATING THE SAME

(71) Applicant: Fina Technology, Inc., Houston, TX (US)

(72) Inventors: Taejun Yoo, Downington, PA (US); Herbert Chao, Paoli, PA (US); Steven K. Henning, Downingtown, PA (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 14/753,449

(22) Filed: Jun. 29, 2015

(65) Prior Publication Data

US 2016/0376386 A1    Dec. 29, 2016

(51) Int. Cl.

| | | |
|---|---|---|
| *C09J 175/16* | (2006.01) | |
| *C09J 147/00* | (2006.01) | |
| *B32B 7/12* | (2006.01) | |
| *C08F 136/22* | (2006.01) | |
| *C08F 36/22* | (2006.01) | |
| *G06F 3/041* | (2006.01) | |
| *G09G 3/36* | (2006.01) | |
| *C08C 19/02* | (2006.01) | |
| *C08C 19/04* | (2006.01) | |
| *C08C 19/38* | (2006.01) | |
| *C08G 18/62* | (2006.01) | |
| *C08G 18/75* | (2006.01) | |
| *C08G 18/24* | (2006.01) | |

(52) U.S. Cl.
CPC .............. *C08F 136/22* (2013.01); *B32B 7/12* (2013.01); *C08C 19/02* (2013.01); *C08C 19/04* (2013.01); *C08C 19/38* (2013.01); *C08F 36/22* (2013.01); *C08G 18/246* (2013.01); *C08G 18/6208* (2013.01); *C08G 18/755* (2013.01); *C09J 147/00* (2013.01); *C09J 175/16* (2013.01); *G06F 3/0412* (2013.01); *G09G 3/36* (2013.01); *B32B 2307/412* (2013.01); *B32B 2457/202* (2013.01); *B32B 2457/208* (2013.01); *C09J 2203/318* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 5,338,588 A | * | 8/1994 | Billiu | B29C 35/08 156/245 |
| 5,867,241 A | | 2/1999 | Sampica et al. | |
| 6,361,389 B1 | | 3/2002 | Hogue et al. | |
| 6,432,475 B1 | * | 8/2002 | Yamamoto | C08F 293/005 427/208.4 |
| 6,552,118 B2 | * | 4/2003 | Fujita | C08F 8/42 106/287.1 |
| 2012/0165474 A1 | * | 6/2012 | McPhee | C08C 19/02 525/314 |
| 2014/0138662 A1 | * | 5/2014 | Goeoetz | H01L 51/5268 257/40 |
| 2014/0234553 A1 | | 8/2014 | O'Hare et al. | |
| 2014/0295150 A1 | | 10/2014 | Bower et al. | |
| 2014/0355117 A1 | | 12/2014 | Bower et al. | |

FOREIGN PATENT DOCUMENTS

| | | | | |
|---|---|---|---|---|
| JP | A07102017 | * | 4/1995 | ................ C08F 8/00 |
| WO | WO 2012/018682 A1 | | 2/2012 | |
| WO | WO 2013/173976 A1 | | 11/2013 | |
| WO | WO 2013/173977 A1 | | 11/2013 | |
| WO | WO 2014/029062 A1 | | 2/2014 | |
| WO | WO 2014/088936 A1 | | 6/2014 | |
| WO | WO 2014/088939 A1 | | 6/2014 | |
| WO | WO 2014/093014 A1 | | 6/2014 | |
| WO | WO 2015/045450 A1 | | 4/2015 | |

OTHER PUBLICATIONS

Machine translation of JPA07102017 (1995).*
International Search Report for International Application No. PCT/US2016/033011 dated Sep. 23, 2016.

* cited by examiner

*Primary Examiner* — Frank D Ducheneaux
(74) *Attorney, Agent, or Firm* — Albert Shung

(57) ABSTRACT

A low viscosity polymer having a linear or branched backbone derived from farnesene monomers and at least one terminal-end functionalized with a hydroxyl group. This polymer may be further hydrogenated to reduce unsaturation and acrylated, such that it may be incorporated into a LOCA composition. The LOCA composition may be used in a laminated screen assembly, such as a touch screen, for electronic devices by adhering the LOCA composition between an optically transparent layer, such as a cover glass, and a display. The cured LOCA composition has a refractive index similar to the optically transparent layer. A method of making the low viscosity polymer for the LOCA composition includes anionically polymerizing farnesene monomers, quenching a living end of the polymer to provide the hydroxyl-terminated polymer; hydrogenating the hydroxyl-terminated polymer; and reacting the at least partially saturated hydroxyl-terminated polymer with at least one reagent to provide an acrylate terminated hydrogenated polymer.

29 Claims, No Drawings

FARNESENE-BASED POLYMERS AND LIQUID OPTICALLY CLEAR ADHESIVE COMPOSITIONS INCORPORATING THE SAME

FIELD OF THE INVENTION

The invention relates to liquid optically clear adhesive (LOCA) compositions and laminated assemblies incorporating the adhesive. More specifically, the invention relates to LOCA compositions comprising a low viscosity polymer derived from farnesene.

BACKGROUND

A display is an indispensable interface that allows human-machine communication for electronic products, such as mobile phones, personal digital assistants, tablets, and notebooks. Recently, touch panels have been integrated with displays in various electronic products; users can conduct various operations through touching the panel in a more convenient fashion. How to provide products that are lighter and thinner and have better visual effects has always been one of the main objectives behind the developments within the electronics industry, and the same is true for the new generation of products that incorporate laminated touch panel/display components.

Optical bonding is bonding of two or more optical components together using a clear optical refractive index-matched adhesive. In its simplest form, optical bonding eliminates the air gap between the a transparent cover, such as a cover glass, and the underlying display, such as an LCD, for example. Removing the air gap eliminates two reflective surfaces and reduces specular reflection. To prevent affecting visual effects, such adhesives should exhibit proper optical properties such as proper light transmittance and refractive index. When light travels through different mediums, reflection occurs due to the difference in refractive indexes, thereby affecting light's extraction efficiency. Optical devices, such as thin film and glass, usually have a relatively high refractive index. For example, the refractive index of glass is about 1.52. A disadvantage to many clear adhesives is that their refractive index is not sufficiently close to the glass substrates to which they may be applied. A common optically-transparent adhesive, such as acrylate adhesive, has a refractive index of about 1.4 to 1.45, which cannot meet current industry standards.

Fully hydrogenated C4 diol resins enable the formulation of optically clear adhesives which are generally used today in touchscreen applications, such as current generation smart phones. Optically clear adhesives allow for touch screens based on capacitive technology to eliminate a traditional multi-layer construction, thereby allowing manufacturers to create thinner, lighter devices. Polybutadiene diols are well-defined, pure materials that when selectively hydrogenated, produce very clear diols which meet the tight refractive index and clarity specifications required for these applications. Polybutadiene-based adhesives also demonstrate excellent moisture resistance and flexibility over a wide temperature range, effectively protecting the sensitive optics and other electronic components of the device. Polybutadiene-based adhesives however have high viscosities making the handling and application of this material difficult unless the adhesives are diluted, and dilution may negatively impact the refractive index of the adhesive. Thus, there is a need for new and improved low viscosity optically-transparent adhesives with a high refractive index.

SUMMARY OF THE INVENTION

It is a first aspect of the present invention to provide a polymer comprising a linear or branched backbone derived from monomers comprising farnesene having at least one terminal-end functionalized with a hydroxyl group. This polymer may serve as an intermediate that may be acrylated.

Another aspect of the present invention is to provide a liquid optically clear adhesive composition comprising a polymer derived from monomers comprising farnesene and having at least one terminal end functionalized with an acrylate group and a degree of unsaturation less than or equal to 50%.

It is yet another aspect of the present invention to provide a liquid optically clear adhesive composition comprising a polymer having a structure according to Formula (I),

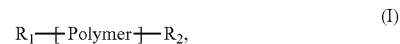

wherein [Polymer] is a linear or branched polymer backbone derived from monomers comprising farnesene, R1 is in alkyl group or R2, and R2 has a structure according to Formula (II) or Formula (III),

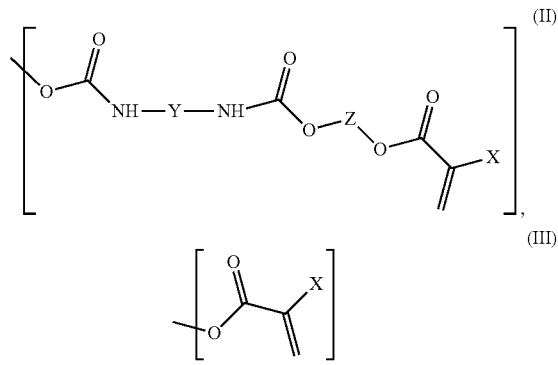

wherein Y and Z are independently selected from the group consisting of linear, cyclic, aliphatic, aromatic, substituted, and non-substituted hydrocarbon groups, and X is independently selected from the group consisting of hydrogen and an alkyl group.

In yet another aspect of the present invention, a method of preparing a liquid optically clear adhesive composition is provided. The method comprising:

anionically polymerizing monomers to provide a polymer having at least one living end, the monomers comprising farnesene;

quenching the at least one living end to provide a hydroxyl-terminated polymer;

hydrogenating the hydroxyl-terminated polymer to provide an at least partially saturated hydroxyl-terminated polymer; and reacting the at least partially saturated hydroxyl-terminated polymer with at least one reagent to provide an acrylate terminated hydrogenated polymer.

Yet another aspect of the present invention is to provide a laminated screen assembly comprising a transparent layer adhered to a display and a cured adhesive between the transparent layer and the display, wherein the adhesive is a liquid optically clear adhesive composition according to the present invention.

These and other aspects of the various embodiments of the present invention will be understood from the following detailed description.

DETAILED DESCRIPTION OF THE INVENTION

Various embodiments of the present invention include farnesene-based intermediate polymers, the hydrogenated and acrylated products of these intermediates, and the LOCA compositions and laminated assemblies comprising the acrylated-polymers. The polymers may be obtained by polymerizing a monomer feed that primarily includes farnesene. The adhesive compositions incorporating the farnesene-based polymers may exhibit a refractive index when cured similar to hydrogenated polybutadienes, but have a lower viscosity compared to hydrogenated polybutadienes. Therefore, the polymers have improved rheological properties and may be handled favorably in adhesive formulations without significant dilution with other photosensitive components that may alter the refractive index of the cured adhesive.

It has been found that polymerizing farnesene according to the present invention results in low viscosity polymers. Any methods known by those having skill in the art may be used to polymerize the farnesene monomers and include, but are not limited to, anionic or free radical polymerization. Anionic polymerization is particularly preferred because anionic polymerization allows greater control over the final molecular weight of the polymer. The living terminal end of the polymer may also be easily quenched using an epoxide followed by contact with a protic source providing a monol, diol, or polyol. The resulting hydroxyl groups on the terminal ends of the polymeric farnesene-based monol, diol, or polyol may be reacted further to provide acrylate groups, for example, such that the polymer may be useful as a curable LOCA composition. The low viscosity farnesene-based polymers prepared according to the present invention may be derived by polymerizing farnesene monomer along or with at least one other monomer. It is preferred that the polymers made according to various embodiments of the present invention are derived from a monomer feed that is primarily composed of farnesene.

According to certain embodiments of the invention, a farnesene-based polymer is provided having a structure according to Formula (I),

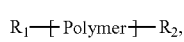
(I)

wherein [Polymer] is a linear or branched polymer backbone derived from monomers comprising farnesene, R1 is in alkyl group or R2, and R2 has a structure according to Formula (II) or Formula (III),

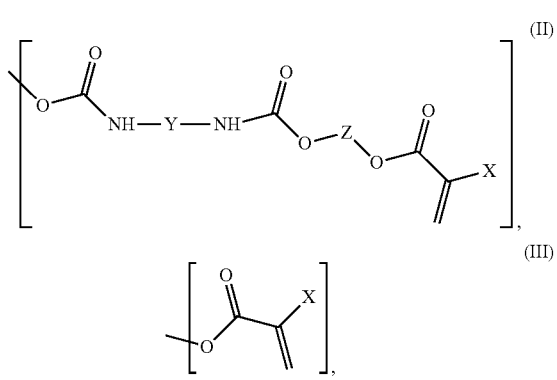

wherein Y and Z are independently selected from the group consisting of linear, cyclic, aliphatic, aromatic, substituted, and non-substituted hydrocarbon groups, and X is independently selected from the group consisting of hydrogen and an alkyl group.

Farnesene exists in isomer forms, such as α-farnesene ((E,E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

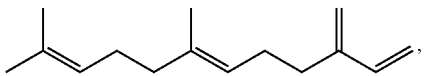

as well (E)-β-farnesene in which one or more hydrogen atoms have been replaced by another atom or group of atoms (i.e. substituted).

The farnesene monomer used to produce various embodiments of the polymer according to the present invention may be prepared by chemical synthesis from petroleum resources, extracted from insects, such as Aphididae, or plants. Therefore, an advantage of the present invention is that the polymer may be derived from a monomer obtained via a renewable resource. It is preferably prepared by culturing a microorganism using a carbon source derived from a saccharide. The farnesene resin according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, and cellulose.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it is preferably a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

In yet another embodiment of the present invention, a method of making a linear or branched farnesene-based polymer useful in a LOCA composition is provided comprising anionically polymerizing monomers to provide a polymer having at least one living end, the monomers comprising farnesene; quenching the at least one living end to provide a hydroxyl-terminated polymer; hydrogenating the hydroxyl-terminated polymer to provide an at least partially saturated hydroxyl-terminated polymer; and reacting the at least partially saturated hydroxyl-terminated polymer with at least one reagent to provide an acrylate terminated hydrogenated polymer. "Acrylate-terminated" as used herein means both an acrylate or methacrylate functional group on the terminal end of the polymer.

The farnesene-based polymers described herein may be prepared by a continuous solution polymerization process wherein an initiator, monomers, and a suitable solvent are continuously added to a reactor vessel to form the desired homo-polymer or co-polymer. Alternatively, the farnesene-based polymers may be prepared by a batch process in which all of the initiator, monomers, and solvent are combined in the reactor together substantially simultaneously. Alternatively, the farnesene-based polymers may be prepared by a semi-batch process in which all of the initiator and solvent are combined in the reactor together before a monomer feed is continuously metered into the reactor.

Preferred initiators for providing a polymer with living terminal chain ends include, but are not limited to organic salts of alkali metals. The polymerization reaction temperature of the mixture in the reactor vessel may be maintained at a temperature of about −80 to 80° C.

As understood by those having skill in the art, anionic polymerization may continue, as long as monomer is fed to the reaction. The farnesene-based polymers used in LOCA compositions according to the present invention may be polymerized from farnesene and one or more comonomers. Examples of comonomers include, but are not limited to, dienes, such as butadiene, isoprene, and myrcene, in which butadiene and isoprene are preferred.

In one embodiment of the present invention, a method of manufacturing a LOCA composition may comprise polymerizing a monomer feed, wherein the monomer feed comprises farnesene monomer and a comonomer in which the comonomer content of the monomer feed is ≤75 mol. %, more preferably ≤50 mol. %, and most preferably ≤25 mol. %, based on the total moles of the monomer in the monomer feed.

The low viscosity farnesene-based homo-polymers or co-polymers according to embodiments of the present invention may have a number average molecular weight less than or equal to 100,000 g/mol, preferably less than or equal to 25,000 g/mol, as measured through a gel permeation chromatograph and converted using polystyrene calibration. The farnesene-based homo-polymers or co-polymers prior to curing may have a viscosity less than or equal to 100,000 cP, more preferably less than 50,000 cP, and most preferably less than or equal to 25,000 cP, wherein viscosity is measured for the LOCA composition at 60° C.

The quenching step to end polymerization is preferably accomplished by reacting the a living terminal end(s) of the living polymer with an alkylene oxide, such as propylene oxide, and a protic source, such as an acid, resulting in a monol, diol, or polyol, i.e. a hydroxyl group on the terminal end(s) of the polymer.

Following polymerization, the hydroxyl-terminated polymer is preferably hydrogenated to decrease the degree of unsaturation of the polymer to at most 50%, more preferably at most 10%. Degree of unsaturation is determined by analytical methods known in the art, such as iodine value.

Acrylate functionalization on the terminal ends of the farnesene-based polymers according to the present invention may be accomplished by reacting the hydroxyl-terminated polymer with at least one reagent. For example, acrylate functionalization may be accomplished by either direct esterification of the hydroxyl groups with an acrylate derivate(s) or through a urethane group by reacting an isocyanate-containing compound, preferably a diisocyanate, with an acrylate and hydroxyl group-containing compound as well as the hydroxyl-terminated polymer. The isocyanate may be selected from the group consisting of isophorone diisocyanate, methylene dicyclohexylisocyanate, 1,6-hexamethylene diisocyanate, and the like. The acrylate and hydroxyl group-containing compound may be selected from the group consisting of 2-hydroxyethyl acrylate, 2-hydroxypropyl (meth)acrylate, 4-hydroxybutyl acrylate, and polyethylene glycol (meth)acrylate. Useful reagents for direct esterification preferably have acrylate functionality, such as acrylic acid, acrylic anhydride, acrylic chloride, or alkyl acrylates.

As discussed above, certain embodiments of the present invention include LOCA compositions comprising a polyfarnesene-based polymer. A LOCA composition made according to the present invention may have reduced levels of reactive diluent and/or plasticizers. Because the farnesene-based polymers of the present invention exhibit low viscosity, less diluent and/or plasticizers are needed to achieve a target viscosity for the LOCA compositions in which they are incorporated by replacing the higher viscosity polybutadiene-based polymers. Thus, certain embodiments of the present invention provide low viscosity LOCA compositions that may comprise a mixture of hydrogenated acrylated farnesene-based polymers and hydrogenated acrylated polybutadiene. LOCA compositions according to the present invention may include 50-90 wt. %, more preferably 60-80 wt. %, and most preferably 65-75 wt. % of the farnesene-based polymer, based on the total weight of the LOCA composition.

LOCA compositions according to the present invention may include one or more reactive diluents. The reactive diluent may include monomers selected from the group consisting of isobornyl acrylate, isobornyl (meth)acrylate, tetrahydrofurfuryl acrylate, tetrahydrofurfuryl methacrylate, alkoxylated tetrahydrofurfuryl acrylate, alkoxylated methacrylate, tetrahydrofurfuryl methacrylate and mixtures thereof. Specific examples of reactive diluent include 2-(tricyclo[5.2.1.0(2,6)]dec-3(or 8)-enyloxy)ethyl methacrylate and 2-hydroxyethyl methacrylate. LOCA compositions according to the present invention may include 25-55 wt. %, more preferably 30-50 wt. %, and most preferably 35-45 wt. % of reactive diluent, based on the total weight of the LOCA composition.

The LOCA compositions according to the present invention may also include additional components including, but not limited to, fillers, plasticizers, and tackifying resins. It is preferred that the various components of the LOCA compositions of the present invention are selected, such that they are compatible with each other and do not phase separate and negatively affect the refractive index of the material.

For example, a plasticizer that increases the softness and flexibility of the cured material may be incorporated in various embodiments of the present invention. Plasticizers are well known and typically do not participate in polymerization of (meth)acrylate groups. One or more plasticizers may be selected from the group consisting of vegetable oil, mineral oil, soybean oil, terpine resins, unsubstituted or carboxy-substituted polyisoprene, polybutadiene, or polybutylene resins, xylene polymer, hydroxyl-terminated polybutadiene or polyolefins, and hydrogenated diene or polybutadiene resins, such as butadiene resins. If present, LOCA compositions according to the present invention may include 20-50 wt. %, more preferably 25-45 wt. %, and most preferably 30-40 wt. % of plasticizer, based on the total weight of the LOCA composition.

Any common tackifiers typically used in a LOCA composition that are known by those having skill in the art may be used in the LOCA compositions according to the present invention. An example of a tackifier is hydrogenated terpene resin, such as hydrogenated cyclohexene, 1-methyl-4-(1-methylenthenyl)-homopolymer sold under the trade name Clearon P85 by Yasuhara Chemical Co. Ltd. If present, LOCA compositions according to the present invention may include 20-50 wt. %, more preferably 25-45 wt. %, and most preferably 30-40 wt. % of tackifier, based on the total weight of the LOCA composition.

Other optional components of the LOCA compositions according to the present invention include, but are not limited to, silicone-based adhesives for additional curable materials, metal oxide particles for modifying the refractive index of the cured material, and rheology modifiers. Photoinitiators may be used in the LOCA compositions when curing with UV radiation. Free radical initiators include organic peroxides, azo compounds, and the like. One example of a UV curing agent is Irgacure 184D sold by BASF. If present, it is preferred that one or more photoinitiators are present in an amount less than or equal to 10 wt. %, more preferably less than or equal to 5 wt. %, and most preferably less than or equal to 3 wt. %, based on the total weight of the LOCA composition. The liquid compositions and adhesive layers can optionally include one or more additives such as antioxidants, stabilizers, fire retardants, viscosity modifying agents, antifoaming agents, antistatic agents and wetting agents.

In yet another embodiment of the present invention, a laminated screen assembly is provided comprising an optically transparent layer adhered to a display, such as an LCD, an organic electroluminescence panel, electrophoretic display, or plasma display, and a cured adhesive between the transparent layer and the display, wherein the adhesive is a LOCA composition comprising a farnesene-based polymer. The laminated screen assembly may further comprise a touch panel sensor layer between the transparent layer and the display, wherein the cured adhesive is adhered to the touch panel sensor layer and at least one of the transparent layer and the display. In other embodiments, the touch panel sensor layer may be disposed between two optically transparent layers. The touch panel sensor layer may comprise indium tin oxide. The laminated screen assemblies according to various embodiments of the present invention may be incorporated in a variety of devices including, but not limited to, a handheld device such as a phone, a television, a computer monitor, an automotive interior display, a projector, or a sign. The optical device may comprise a backlight.

LOCA compositions according to the present invention may be used to fill gaps between optical components or substrates of a laminated screen assembly in electronic products. A gap between component layers of the laminate may be filled by pouring or injecting a curable composition into the gap followed by curing the composition to bond the components together. Assemblies having a filled gap can exhibit improved shock-resistance compared to the same assemblies having an air gap.

The optically transparent layer used in the laminated screen assembly may comprise any transparent material known to those having skill in the art, such as glass or a polymer, for example. Useful glasses include borosilicate, soda lime, and other glasses suitable for use in display applications as protective covers. Useful polymers include polyester films such as polyethylene terephthalate, polycarbonate films or plates, acrylic films such as polymethylmethacrylate films, and cyclo-olefin polymer. The transparent material may be in the form of a cover lens, for example.

As explained above, the LOCA compositions incorporated in the laminated screen assemblies according to various embodiments of the invention preferably has a refractive index that matches or closely matches that of the display and/or optically transparent layer. For example, the cured LOCA composition may have a refractive index greater than or equal to 1.4, more preferably greater than or equal to 1.45, and most preferably greater than or equal to 1.5. It is most preferably preferred that the cured LOCA composition has a refractive index within 10% of the refractive index of the optically transparent layer, more preferably within 5%.

LOCA compositions according to the present invention may facilitate easier manufacture of assemblies having a large size or area. For example, panels and substrates having a large area will also have large gaps requiring a large volume of low viscosity adhesive to adequately fill the entire gap. Highly viscous compositions may be difficult to apply and may take longer to completely fill such large volumes, thus requiring diluted compositions to provide a less viscous and more easily applied composition. However, diluted compositions, as explained above, may result in adhesive compositions having less than optimal refractive indices when cured, and a poorly mixed large volume of adhesive may also result in non-uniform optical characteristics over the area of the panel assembly. LOCA compositions according to the present invention avoid these disadvantages by providing compositions having a high refractive index and low viscosities that do not generally require a diluent for application. For ease of application of the adhesive and improved manufacturing of the laminated screen assemblies, it is also preferred that the LOCA compositions prior to curing have a viscosity less than or equal to 10,000 cP, most preferably less than or equal to 5,000 cP, wherein viscosity is measured for the LOCA composition at 25° C.

The LOCA compositions according to the present invention may be applied by any method known to those of skill in the art. The low viscosity of the composition allow them to be easily applied by spray or coating methods, for example. Methods used to assemble the laminated screen assemblies according to the present invention are known by those having skill in the art, for example, the methods described in U.S. Pat. No. 6,361,389 and U.S. Pat. No. 5,867,241, which are incorporated herein by reference in their entireties. The LOCA composition may be cured during application to one of the layers of the assembly or after assembly of the laminated panel assemblies by UV-radiation and/or heat. Electron beam radiation may also be used.

EXAMPLE

An embodiment of the present invention is furthers described using the following non-limiting example.

Step A—Farnesene-Based Diol Synthesis

In a semi-batch process, a difunctional organolithium initiator in a polar solvent was transferred to a reactor, and sufficient farnesene monomer to achieve an approximate target molecular weight of 2000 g/mol was continuously added. The polymerization reaction was performed at 25-40° C. and terminated with an excess of propylene oxide followed by neutralization with a weak acid and the addition of BHT as an antioxidant to provide a poly-farnesene diol. The final solution was washed with water to reduce/eliminate alkalinity. The organic phase was separated from water phase and then solvent was removed from the separated organic phase by steam stripping under nitrogen atmosphere.

Step B—Hydrogenation 319 g of the poly-farnesene diol, 7.2 g of Ni catalyst and 336 g of heptane as a solvent were transferred to a pressure reactor, followed by purging with hydrogen three times. The reaction temperature was set to 100-130° under hydrogen pressure. Before the temperature reached the boiling point of the solvent, the reaction mixture was purged with nitrogen three times and hydrogen was continuously fed to the reaction. The reaction temperature was controlled by stirring speed and hydrogen pressure. In order to monitor the reaction, aliquot samples were periodically taken and analyzed using FTIR after drying the solvent. The unsaturated peak was measured of each sample. This procedure was repeated until the unsaturated peaks disappeared completely. The reaction mixture was then cooled down to room temperature, catalyst was removed by filtration, and the final solution was stripped under vacuum.

Step C—Acrylation

Urethane acrylates were first prepared by reacting isophorone diisocyanate (IPDI) with 2-hydroxyethyl acrylate (HEA) to make acrylated isocyanate. 25 g of IPDI, 0.25 g of Irgonox 1010, and 0.25 g of dibutyltin dilaurate (DBTDL) were transferred to a resin kettle equipped with a mechanical stirrer, thermocouple, dropping funnel, and air spurge. 11.9 g of 2-hydroxyethyl acrylate (HEA) was continuously added to the reaction mixture at room temperature, and the temperature reached 40° C. after complete addition.

The acrylated isocyanate was then reacted with a sample of the hydrogenated polyfarnesene diol from Step B or with a comparative sample of hydrogenated polybutadiene diol (Krasol HLBH-P2000 manufactured by Total Cray Valley of Exton, Pa.) according to the reaction shown below.

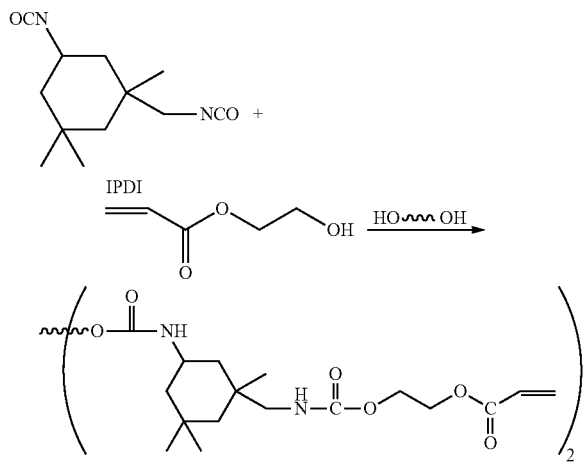

0.17 g of Irgonox 1010 and 0.25 g of DBTDL was added to the reactor, and 125 g of diol was gradually added and increased the temperature to 70° C. An aliquot of reaction mixture was sampled to measure the NCO value after 1 hour. Additional diol was added until the NCO value was below 1 mg KOH/g. The viscosity and refractive index (RI) was measured of the acrylated material, and the results are provided below in Table 1. Viscosity was measured using a Brookfield viscometer DV-II+Pro and a size 31 spindle. The rpm setting for HLBH-P2000 was 0.3 and 6.0 for the hydrogenated poly-farnesene.

TABLE 1

| Diol | Viscosity @60° C. (cps) | RI |
|---|---|---|
| HLBH-P2000 | 54,400 | 1.482 |
| Hydrogenated Poly-Farnesene | 2,055 | 1.476 |

As demonstrated in the results provided in Table 1, the acrylated and hydrogenated polyfarnesene made according to an embodiment of the present invention exhibited a refractive index similar to that of the polybutadiene-based material, but had a significantly lower viscosity.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A liquid optically clear adhesive composition comprising a polymer derived from monomers comprising farnesene, the polymer being obtained from a diol wherein hydroxyl groups of the diol have been further reacted to provide terminal ends functionalized with (meth)acrylate groups and wherein the polymer has a degree of unsaturation of less than or equal to 50%, wherein the adhesive composition has a refractive index greater than 1.45 after curing.

2. The liquid optically clear adhesive of claim 1, wherein the polymer is derived from monomers further comprising one or more dienes.

3. The liquid optically clear adhesive of claim 2, wherein the dienes are selected from the group consisting of butadiene, isoprene, and myrcene.

4. The liquid optically clear adhesive of claim 1, wherein the polymer further comprises urethane groups.

5. The liquid optically clear adhesive composition of claim 1, wherein the polymer further comprises ester groups.

6. The liquid optically clear adhesive composition of claim 1, wherein the polymer has a degree of unsaturation less than or equal to 10%.

7. The liquid optically clear adhesive composition of claim 1, wherein the polymer is curable by UV light, electron beam, or heat.

8. The liquid optically clear adhesive composition of claim 1, wherein when cured, the adhesive has a refractive index greater than 1.5.

9. The liquid optically clear adhesive composition of claim 1, wherein the polymer has a number average molecular weight less than or equal to 100,000 g/mol.

10. The liquid optically clear adhesive composition of claim 1, wherein the polymer has a number average molecular weight less than or equal to 25,000 g/mol.

11. The liquid optically clear adhesive composition of claim 1 having a viscosity at 25° C. less than 10,000 cP.

12. A laminated screen assembly comprising the liquid optically clear adhesive of claim 1 disposed between optically transparent substrate layers.

13. A laminated screen assembly comprising a transparent layer adhered to a display and a cured adhesive between the transparent layer and the display, wherein the adhesive is the liquid optically clear adhesive composition of claim 1.

14. The laminated screen assembly of claim 13 further comprising a touch panel sensor layer between the transparent layer and the display, wherein the cured adhesive is adhered to the touch panel sensor layer and at least one of the transparent layer and the display.

15. The laminated screen assembly of claim 13, wherein the cured adhesive has a refractive index within 10% of the refractive index of the transparent layer.

16. The laminated screen assembly of claim 13, wherein the cured adhesive has a refractive index within 5% of the refractive index of the transparent layer.

17. A method of preparing a liquid optically clear adhesive composition comprising:
   anionically polymerizing monomers to provide a polymer having at least one living end, the monomers comprising farnesene;
   quenching the at least one living end to provide a hydroxyl-terminated polymer;
   hydrogenating the hydroxyl-terminated polymer to provide an at least partially saturated hydroxyl-terminated polymer; and
   reacting the at least partially saturated hydroxyl-terminated polymer with one or more reagents to provide an acrylate terminated hydrogenated polymer.

18. The method of claim 17, wherein the monomers further comprise one or more dienes.

19. The method of claim 18, wherein the dienes are selected from the group consisting of butadiene, isoprene, and myrcene.

20. The method of claim 17, wherein the polymer has two living ends that are quenched to provide a diol.

21. The method of claim 17, wherein the at least partially saturated hydroxyl-terminated polymer has a degree of unsaturation less than or equal to 50%.

22. The method of claim 17, wherein the at least partially saturated hydroxyl-terminated polymer has a degree of unsaturation less than or equal to 10%.

23. The method of claim 17, wherein reacting the at least partially saturated hydroxyl-terminated polymer with the one or more reagents forms an ester group.

24. The method of claim 17, wherein reacting the at least partially saturated hydroxyl-terminated polymer with the one or more reagents forms a urethane group.

25. The method of claim 24, wherein the one or more reagents comprise isophorone diisocyanate and 2 hydroxyethyl acrylate.

26. A polymer comprising a linear or branched backbone derived from a monomer feed comprising farnesene and a comonomer, the farnesene content of the monomer feed being greater than or equal to 25%, by mole, the polymer having terminal ends functionalized with (meth)acrylate groups and a viscosity at 60° C. of equal to or less than 25,000 cP before curing.

27. The polymer of claim 26 having a degree of unsaturation less than or equal to 50%.

28. The polymer of claim 26, wherein the comonomer consists of a diene.

29. The polymer of claim 26, wherein the farnesene content of the monomer feed is greater than or equal to 50%, by mole.

* * * * *